June 13, 1967  R. E. MILLER ET AL  3,324,766
LENS COLLIMATING DEVICE
Filed Sept. 18, 1962  4 Sheets-Sheet 4

INVENTORS:
ROBERT E. MILLER
JAMES DES JARDINS
WILLIAM E. SOONG
BY
ATTORNEY

United States Patent Office 3,324,766
Patented June 13, 1967

3,324,766
LENS COLLIMATING DEVICE
Robert E. Miller, James Des Jardins, and William E. Soong, Chicago, Ill., assignors, by mesne assignments, to the United States of America as represented by the Secretary of the Army
Filed Sept. 18, 1962, Ser. No. 224,579
7 Claims. (Cl. 88—56)

This invention relates to lens collimating devices, and more particularly to a device which functions automatically to collimate lens doublets one after the other.

Heretofore the operation of lens collimating devices has involved various steps requiring more or less manual skill. For this reason, the production speed of the lens is slow and its cost is high. This is objectionable especially in the case of an emergency where the lenses are to be utilized in fire control apparatus and a large number of them must be made available in a very short time. The present invention solves this problem by the provision of a device or machine which is adapted to accept trays filled with lens doublets arranged in rows, and operates automatically to collimate these doublets one by one and to thereafter deposit them in rows in trays by which they are removed from the machine.

This machine includes loading and unloading tables which are located at the opposite sides of a collimating head. The trays containing the doublets to be collimated are positioned on the loading table and empty trays are positioned on the unloading table. During operation of the machine, the lens doublets are picked up one after another by a loading head which transports them to the collimating head where they are collimated. Thereafter the doublets are transported by an unloading head to the empty trays on the unloading table and at the same time another lens doublet is brought to the collimating head by the loading head. As will appear, these various operations are effected automatically by means of a lens transfer control circuit, a collimating control circuit and a table positioning circuit, all of these circuits being synchronously interrelated.

The invention will be better understood from the following description when considered in connection with the accompanying drawings and its scope is indicated by the appended claims.

Figure 1:
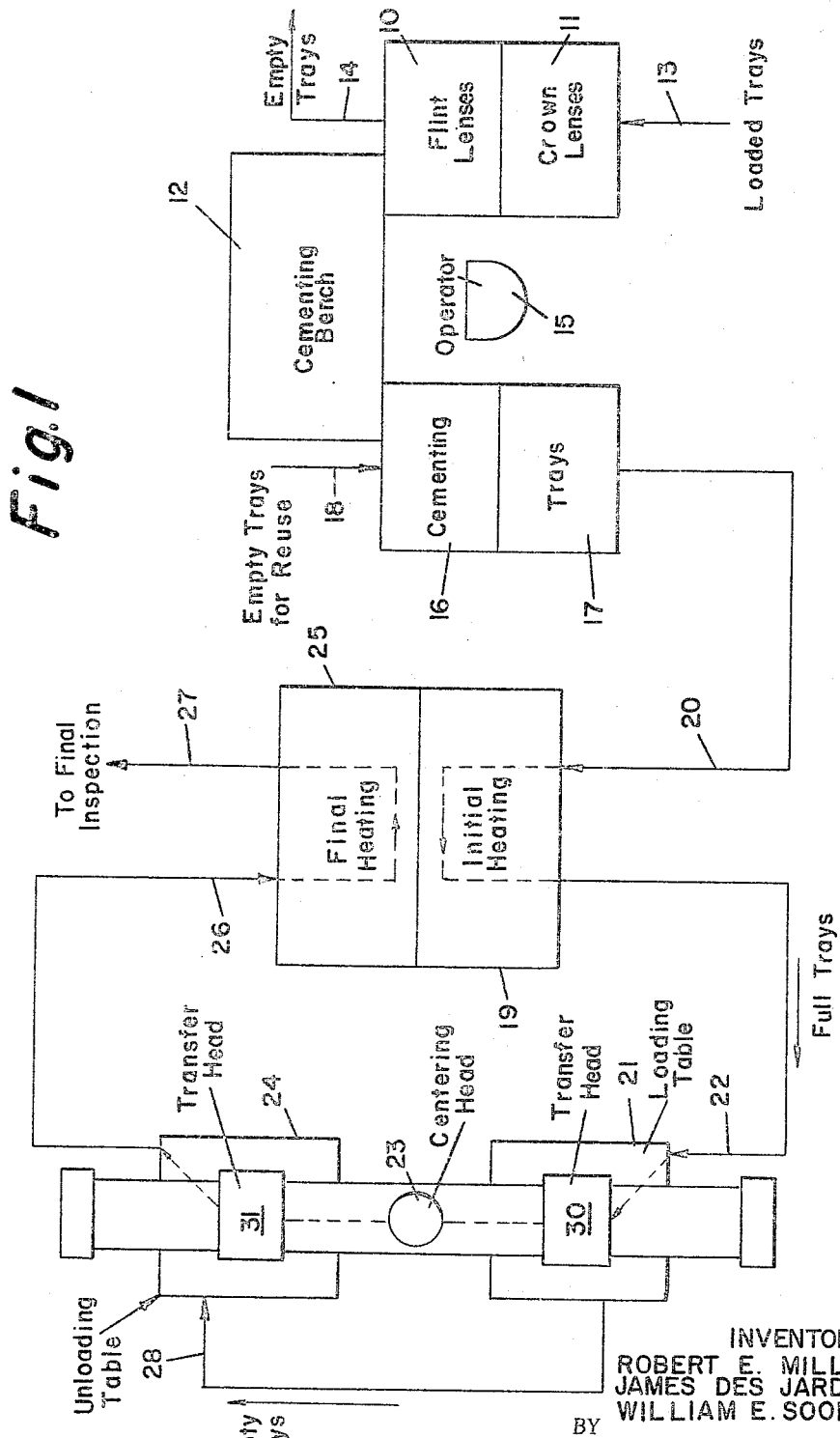
Figure 2:
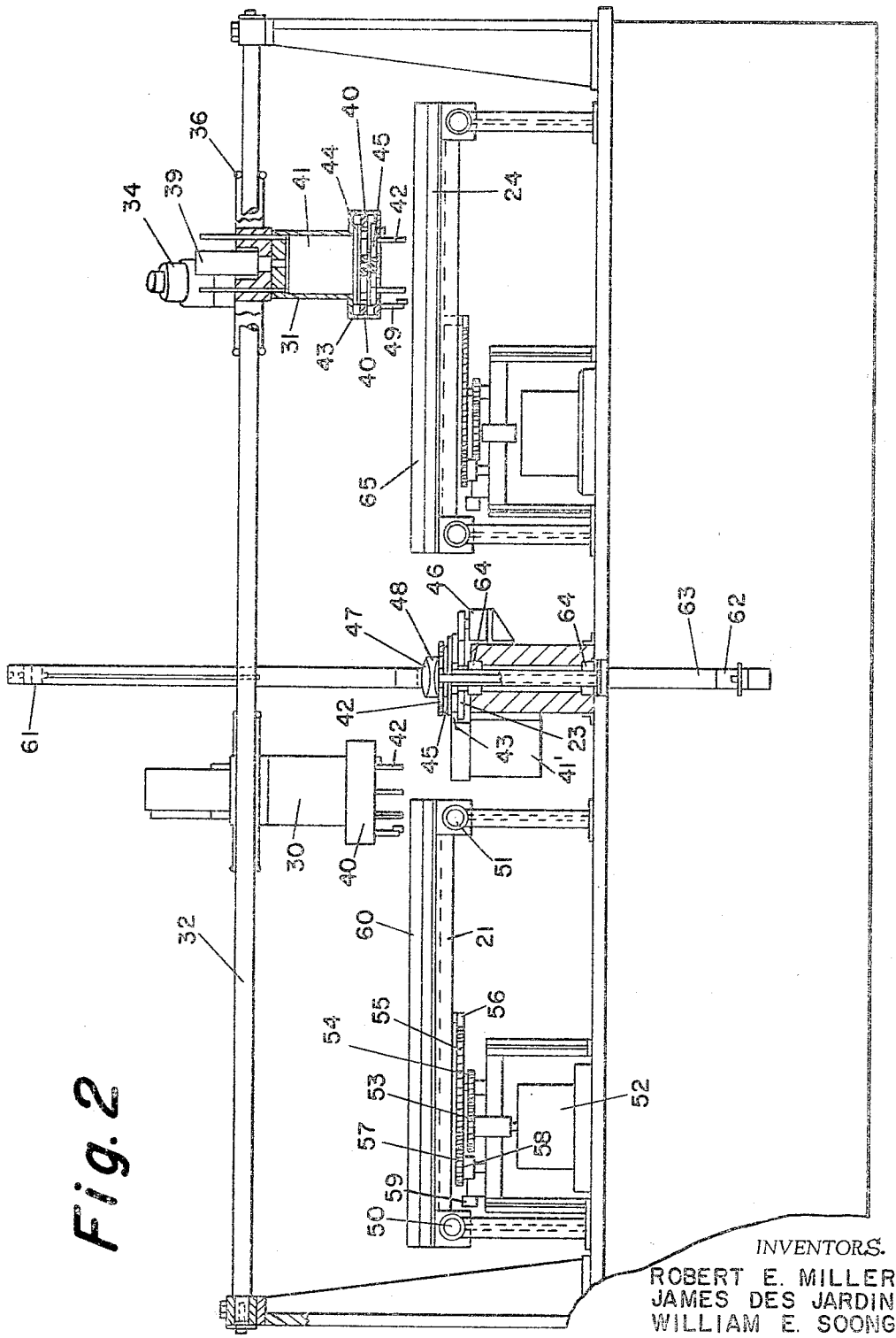
Figure 3:
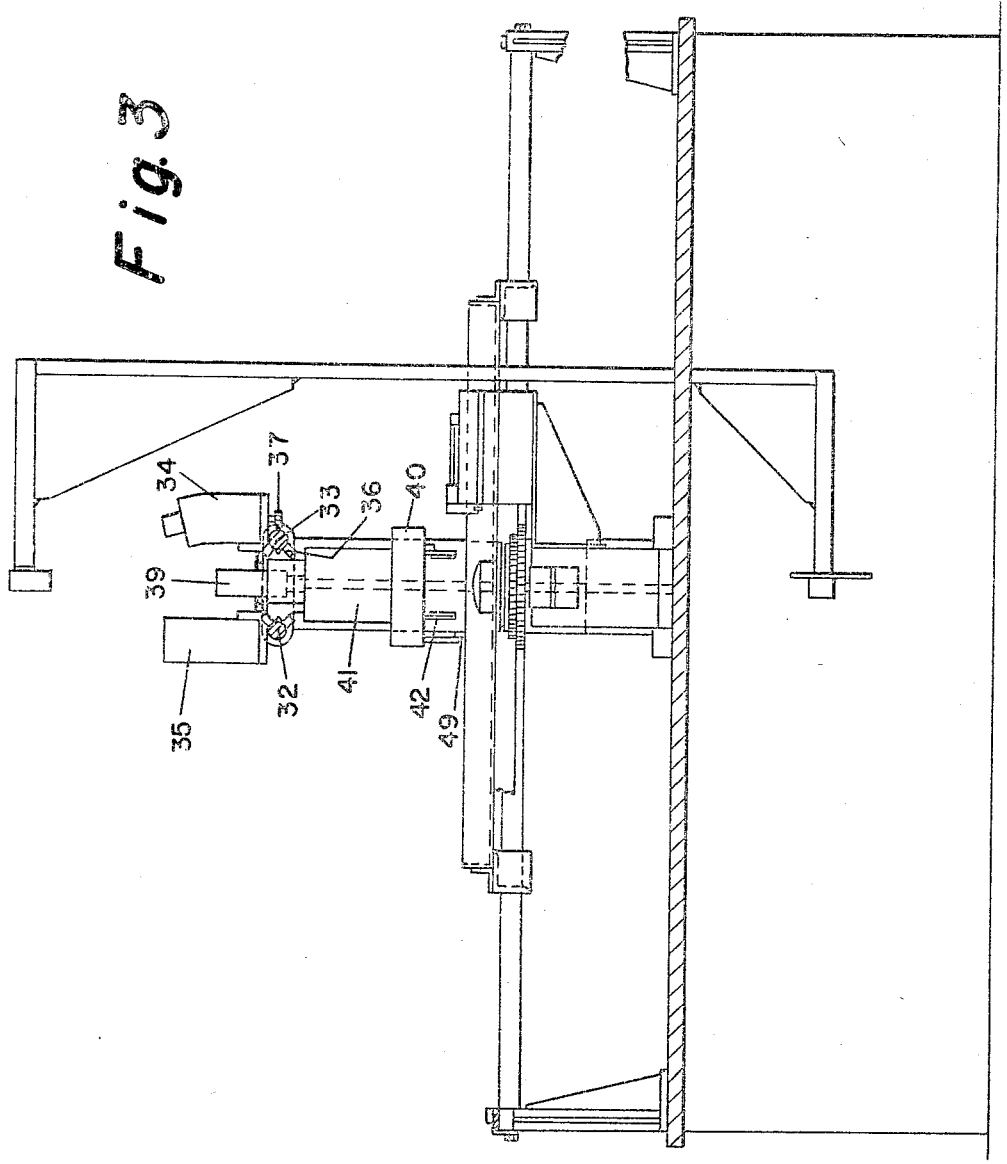
Figure 4:
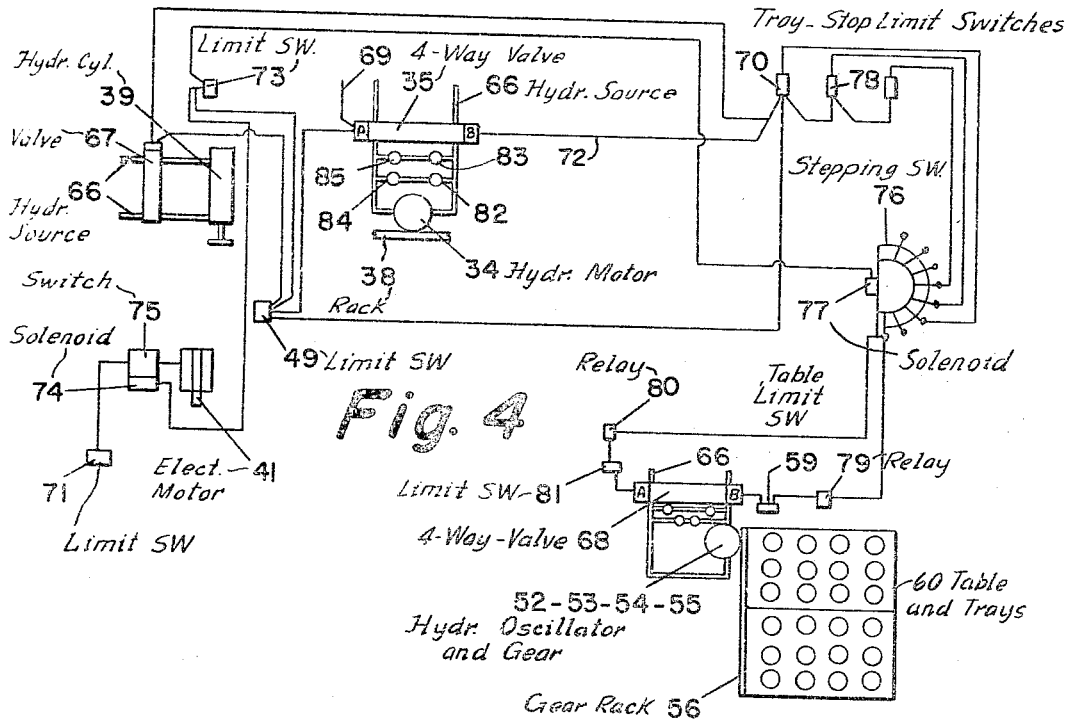
Figure 5:
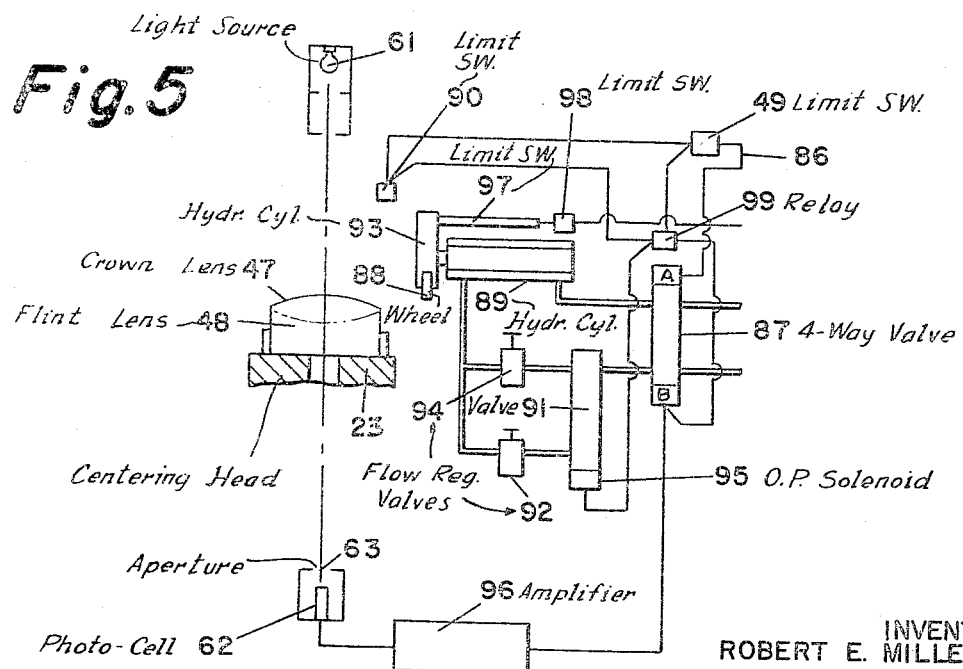

FIG. 1 is a flow diagram of a lens cementing system of which the herein disclosed automatic collimating machine may form a part, FIGS. 2 and 3 are side and end views of the automatic collimating machine, certain parts being cut away to expose details otherwise hidden to view, FIG. 4 shows the lens transfer control circuit whereby the lens are transferred to and from the collimating head, and FIG. 5 illustrates the collimating control circuit.

The flow diagram of FIG. 1 shows a tray 10 of flint lenses a tray 11 of crown lenses which are manually brought to a cementing bench 12 as indicated by an arrow 13 and are manually removed therefrom when they are emptied as indicated by the arrow 14. At ths cementing bench 12 the lenses are cleaned, cemented and rendered free of air bubbles by an operator 15 who places them in cementing trays 16 and 17 which are manually transported to their illustrated positions as indicated by an arrow 18. Thereafter the trays 16 and 17 are manually transported to a furnace 19 as indicated by an arrow 20. From the furnace 19, the trays 16 and 17 are transferred manually to the loading table 21 of the automatic collimating machine illustrated by FIGS. 2 and 3, this transfer being indicated by an arrow 22.

As hereinafter explained in greater detail, the lenses are transferred automatically one by one from the trays 16 and 17 to a centering head 23 and thence to a pair of lens receiving trays on an unloading table 24. When these receiving trays are filled, they are manually transported to a furnace 25 as indicated by an arrow 26. From the furnace 25 the receiving trays are manually transferred to an inspection post (not shown) as indicated by the arrow 27. The trays 16 and 17 (now emtpy) are manually transferred to the unloading table 24 as indicated by an arrow 28, and a pair of full trays are transferred to the loading table 21, thus initiating the next cycle of operation.

The automatic collimating machine of FIGS. 2 and 3 includes (in addition to the loading table 21 and the unloading table 24 and the centering head 23), a loading lens transfer head 30 and an unloading transfer head 31. The lens transfer heads 30 and 31 are similar. Each is movable along a pair of rails 32 and 33 (FIG. 3) by a hydraulic motor 34 of a suitable commercial type, which has its direction of rotation controlled by a hydraulic valve 35. This motor functions through a pinion 37 and a rack 38 to drive the lens transfer head to and fro on the tracks 32 and 33 upon its supporting rollers 36. How the hydraulic valve 35 is operated to vary the rotational direction of the motor 34 is hereinafter explained in connection with the collimating lens transfer control circuit of FIG. 4.

Each of the lens transfer head is raised and lowered by a hydraulic cylinder 39. The lens transfer heads 30 and 31 and the centering head 23 each have a chuck 40 which is operated by an electric motor 41. This may be a commercial type direct-current shunt wound reversible 1/50 HP motor operating at a speed of 1725 r.p.m. By means of a speed reducer, the chuck of the centering head 23 is rotated at a speed of 72 r.p.m., in the present example.

The chuck 40 has three pin type jaws 42 which are opened and closed by the motor 41. This is effected by a cam plate 43 which is rotated by the motor and has three helical slots. Cooperating with these slots are three cam followers 44 and three sliding plates 45 which impart the required motion to the jaws 42. The chuck of the centering head 23 has an electric brake 46, which is actuated by a signal at a time determined by the machine cycle control unit, for retarding the spindle rotation to allow the motor 41 to close the chuck jaws on the lens doublet 47–48. Associated with the lens transfer heads 30 and 31 are limit switches 49 for indicating when the chucks are open.

The loading and unloading tables 21 and 24 are supported and moved in the same way. As indicated in FIG. 2, the loading table 21 is supported by and movable along rods 50 and 51. Movement of the table 21 along the rods 50 and 51 is effected by a suitable rotary oscillating torque actuator 52. This actuator is mechanically coupled to the table through gears 53, 54 and 55 and a rack 56, and may be of the type known commercially as a "Rotac" Model HM-54–IV, for example.

In mesh with the gear 55 is a gear 57 for driving a cam 58 which operates a limit switch 59 to stop the table 21 on its forward stroke with a row of lens doublets in a tray 60 under the transfer head 30.

Associated with the centering head 23 are a light source 61 and a photocell 62 to which light is transmitted through the lens doublet 47–48 and an aperture 63. The lenses 47 and 48 are collimated by rotating the head 29 in preloaded precision bearings 64 at a speed of 72 r.p.m.

Operation of the collimating machine shown in FIGS. 2 and 3 is automatically effected by the control circuit of FIG. 4. As previously indicated, this operation involves moving the loading head 30 to pick up a lens doublet from the tray 60 and deposit it on the centering head 23 and simultaneously moving the unloading head 31 to pick up a lens doublet from the centering head 23 and deposit it in a tray 65 on the unloading table 24. The collimating is accomplished by chucking the flint lens of the doublet in the rotating centering head 23 and bringing a centering wheel 88 (FIG. 5) to bear on the crown lens surface until the light beam from the light source 61 passes through the doublet without bending.

Hydraulic pressure for operating the machine of FIGS. 2 and 3 is applied from a source 66 which is connected (1) through the valve 35 to the motor 34, (2) through a valve 67 to the hydraulic cylinder 39 and (3) through a valve 68 to the actuator 52. The valves 35, 67 and 68 are 4-way valves which function in a well known manner to transfer pressure between the opposite sides of a piston which moves in a cylinder or the like. The valves 35 and 68 are solenoid operated and spring centered. The valve 67 is spring offset.

Operation of the machine is initiated by a signal applied from the head start control circuit to a lead 69 of the A solenoid of the valve 35. This operates the valve 35 to transmit to the motor 34 a force whereby the head 30 is moved to the tray 60 where it is stopped by engagement with the first tray stop limit switch 70 which completes a circuit whereby the valve 67 is energized and the piston in the cylinder 39 is actuated to lower the chuck 40 to a lens doublet in the tray 60. When the chuck touches the tray, the chuck operating limit switch 71 is actuated to start the motor 41 and close the chuck 40 on the lens doublet.

Closure of the chuck releases the chuck jaw position indicator limit switch 49 which closes a circuit 72 through which the B solenoid of the valve 35 is energized and the transfer head 30 is moved to the centering head 23. When the transfer head is directly over the centering head, it actuates the machine stop limit switch 73 to deenergize the solenoid B, arrest the head 30 and actuate the piston of the hydraulic cylinder 39 to lower the head 30. When the head 30 touches the head 23, the switch 71, mounted on the face of the transfer head chuck, is actuated to energize a solenoid 74 and close a reversing switch 75 for reversing the rotation of the motor 41. This releases the lens into the collimating head chuck and actuates the chuck jaw position indicator switch 49 through which the piston of the cylinder 39 is energized to raise the head and the solenoid A is energized to actuate the motor 34 whereby the head is moved back toward the tray.

Stationing of the tray 60 under the transfer head 30 for pickup of the proper lens is controlled by a stepping switch 76. Each time the transfer head actuates the machine stop limit switch 73, the stepping switch 76 is operated by a solenoid 77 to the next contact which is connected to the following tray stop limit switch 78. When the transfer head 30 returns for another lens pick-up, it stops over the lens following the one it has picked up on the preceding trip as preselected by the stepping switch.

When the last lens in a row has been picked up, the stepping switch 76 automatically returns to its original position. In this position, it operates a relay 79 through which the B solenoid of the valve 68 is energized and the actuator 52 is actuated to move the table 60 to a position where the next row of lenses is under the transfer head. At this point, the cam operated switch 59 deenergizes the B solenoid of the valve 68. After all the lenses in the tray have been picked up, the solenoid A of valve 68 is energized by a relay 80 and the table is returned to its original position where it is stopped by opening of a table return limit switch 81. It is to be noted that there is connected in shunt to the valve 35 a hydraulic motor stopping circuit composed of check valves 82 and 83 and relief valves 84 and 85. A similar stopping circuit is associated with the valve 68. As previously indicated the operation of the unloading head 31 is similar to that of the loading head 30 and is synchronized therewith.

The collimating control circuit of FIG. 5 is controlled by the chuck jaw position indicator switch 49. When the chuck is open, this switch closes a circuit 86 through which the A solenoid of a 4-way valve 87 is energized. This valve is spring centered and passes operating fluid to hydraulic cylinders 89 and 93, the pistons of which move a centering wheel 88 toward the lens doublet 47–48 in a fast initial approach which is controlled by a needle valve 94. Immediately before the wheel 88 touches the lens, a final approach limit switch 90 is actuated to energize the solenoid 95 of a 3-way valve 91 which is spring returned upon deenergization of the solenoid. Energization of the solenoid 95 switches operating fluid to the feed needle valve 92 for final controlled centering of the crown lens 47 on the flint lens 48. As the wheel 88 started to advance toward the lenses, it functioned through a member 97, to operate a switch 98 which interrupted a connection in the circuit of the transfer head.

When the lenses are centered, a current passed by the photocell 62 and an amplifier 96 energizes the B solenoid of the valve 87 and relay 99. Energization of the B solenoid retracts the wheel 88, and energization of the relay 99 deenergizes the solenoid of the valve 91 thereby permitting it to be spring returned to its closed position. As the wheel 88 approaches its final retracted position, the member 97 operates the switch 98 to complete a connection in the operating circuit of the transfer head so that the operating cycle of the machine may be repeated.

We claim:

1. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit switch actuated by said loading head for stopping said loading head in a position to permit its chuck to engage a selected one of said lens doublets, means including a circuit closed by engagement of said loading head with said tray for closing said chuck and actuating said chuck operated switch, a collimating head, means including a circuit completed upon the actuation of said chuck operated switch for moving said loading head to said collimating head, means including a stop switch actuated by said loading head upon its alignment with said collimating head for arresting the motion of said loading head and lowering said selected lens doublet to said collimating head, and means including a circuit completed by engagement of said heads for opening said chuck and releasing said selected lens doublet upon said collimating head.

2. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit switch actuated by said loading head for stopping said loading head in a position to permit its chuck to engage a selected one said lens doublets, means including a circuit closed by engagement of said loading head with said tray for closing said chuck and actuating said chuck operated switch, a collimating head, means including a circuit completed upon the actuation of said chuck operated switch for moving said loading head to said collimating head, means including a stop switch actuated by said loading head upon its alignment with said collimating head for arresting the motion of said loading head and lowering said selected lens doublet to said collimating head, means including a circuit completed by engagement of said heads for opening said chuck and releasing said selected lens doublet upon said collimating head, means for effecting the collimation of said selected lens doublet, and means for completing said start circuit upon the completion of said collimation.

3. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit switch actuated by said loading head for stopping said loading head in positions to permit its chuck to select the successive lens doublets of said rows, means including a circuit closed by engagement of said loading head with said tray for closing said chuck and actuating said chuck operated switch, a collimating head, means including a circuit completed upon the actuation of said chuck operated switch for moving said loading head to said collimating head, means including a stop switch actuated by said loading head upon its alignment with said collimating head for arresting the motion of said loading head and lowering said selected lens doublet to said collimating head, means including a circuit completed by engagement of said heads for opening said chuck and releasing said selected lens doublet upon said collimating head, thereby to transfer said lens doublets one by one from said tray to said collimating head, means for successively centering and collimating said lens doublets in said head, a receiving tray, and means including an unloading head having a second chuck and a motor for opening and closing said chuck for successively transferring the collimated lens doublets from the collimating head to the second tray.

4. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit switch actuatable to successive positions by said loading head for stopping said loading head in successive positions where it can pick up successive ones of the lens doublets in said rows, means operable upon the removal of all the lens doublets of one of said rows to move the next successive row of said lens doublets into a position to be picked up by said loading head, means including a circuit closed by engagement of said loading head with said tray for closing said chuck and actuating said chuck operated switch, a collimating head, means including a circuit completed upon the actuation of said chuck operated switch for moving said loading head to said collimating head, means incluuding a stop switch actuated by said loading head upon its alignment with said collimating head for arresting the motion of said loading head and lowering said selected lens doublet to said collimating head, and means including a circuit completed by engagement of said heads for opening said chuck and releasing said selected lens doublet upon said collimating head.

5. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit swtch actuated by said loading head for stopping said loading head in a position where its chuck can engage a selected one of said lens doublets, means including a circuit closed by engagement of said loading head with said tray for closing said chuck and actuating said chuck operated switch, a collimating head, means including a circuit completed upon the actuation of said chuck operated switch for moving said loading head to said collimating head, means including a stop switch actuated by said loading head upon its alignment with said collimating head for arresting the motion of said loading head and lowering said selected lens doublet to said collimating head, means including a circuit completed by engagement of said heads for opening said chuck and releasing said selected lens doublet upon said collimating head, means for effecting collimation of said selected lens doublet, said collimation effecting means including a centering wheel and means for proudcing a fast initial approach of said wheel to said selected lens doublet and a slow final approach of said wheel to said selected lens doublet, and means operated upon the completion of said collimation to retract said wheel from said lens doublet.

6. In an electrically-controlled device for successively collimating lens doublets arranged in rows in a conductive tray, the combination therewith of a loading head having a chuck and a motor for opening and closing said chuck, a switch actuated by said chuck, means actuated by a signal transmitted through a start circuit for moving said loading head to said tray, means including a limit switch actuated by said loading head for stopping said loading head in a position where its chuck can engage a selected one of said lens doublets, means including a circuit closed by engagement of said loading head with said tray for closing said chuck and actuating said chuck operated switch, a collimating head, means including a circuit completed upon the actuation of said chuck operated switch for moving said loading head to said collimating head, means including a stop switch actuated by said loading head upon its alignment with said collimating head for arresting the motion of said loading head and lowering said selected lens doublet to said collimating head, means including a circuit completed by engagement of said heads for opening said chuck and releasing said selected lens doublet upon said collimating head, and means for effecting collimation of said selected lens doublet, said collimation effecting means including a centering wheel and means for producing a fast initial approach of said wheel to said selected lens doublet and a slow final approach of said wheel to said selected lens doublet.

7. An electrically-controlled lens collimating machine for successively collimating lens elements arranged in rows of trays, comprising in combination, a movable loading table for full trays of said elements to be collimated, a movable unloading table for empty trays to be filled with collimated elements, an interposed rotatable collimating head, a loading head movable between said loading table and the collimating head, an unloading head movable between said collimating head and the unloading table, means including a lens transfer control circuit for operating said loading heads to pick up and transport said lens elements from said loading table trays to said collimating head and from said collimating head to the unloading table trays successively, means including a collimating control circuit for successively centering and collimating said lens elements on said head, and means including a table positioning circiut connected with each table for moving said tables individually to permit said loading and unloading heads to select and deposit successive individual lens elements in the established rows and to select successive rows thereof within the paths of movement of said loading and unloading heads.

References Cited

UNITED STATES PATENTS

| | | | |
|---|---|---|---|
| 2,352,179 | 6/1944 | Bolsey | 88—56 X |
| 2,653,502 | 9/1953 | Meyer et al. | 214—1 X |
| 3,008,577 | 11/1961 | Miles | 88—56 X |

JEWELL H. PEDERSEN, *Primary Examiner.*

T. L. HUDSON, C. E. QUARTON, *Assistant Examiners.*